US012172525B1

United States Patent
Bhide et al.

(10) Patent No.: US 12,172,525 B1
(45) Date of Patent: Dec. 24, 2024

(54) FOUR SPEED ELECTRIC VARIABLE TRANSMISSION FOR REAR WHEEL DRIVE HYBRID VEHICLES

(71) Applicant: FCA US LLC, Auburn Hills, MI (US)

(72) Inventors: Sachin Bhide, Rochester Hills, MI (US); Omkar D Rane, Lake Orion, MI (US); Matthew Tolkacz, Birmingham, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/651,787

(22) Filed: May 1, 2024

(51) Int. Cl.
  *F16H 3/72* (2006.01)
  *B60K 6/365* (2007.10)
  *B60K 6/48* (2007.10)
  *B60K 6/543* (2007.10)
  *B60K 6/547* (2007.10)
  *F16H 3/66* (2006.01)

(52) U.S. Cl.
  CPC ............. *B60K 6/547* (2013.01); *B60K 6/365* (2013.01); *B60K 6/48* (2013.01); *B60K 6/543* (2013.01); *F16H 3/66* (2013.01); *F16H 3/72* (2013.01); *B60K 2006/4825* (2013.01); *B60Y 2200/92* (2013.01); *F16H 2200/0013* (2013.01); *F16H 2200/0043* (2013.01); *F16H 2200/201* (2013.01); *F16H 2200/2046* (2013.01)

(58) Field of Classification Search
  CPC .......... B60K 6/547; B60K 6/365; B60K 6/48; B60K 6/543; B60K 2006/4825; B60Y 2200/92; F16H 3/66; F16H 3/72; F16H 3/727; F16H 3/728; F16H 2200/0013; F16H 2200/0043; F16H 2200/201; F16H 2200/2046
  See application file for complete search history.

(56) References Cited

U.S. PATENT DOCUMENTS

| | | | | |
|---|---|---|---|---|
| 9,376,007 | B2 * | 6/2016 | Kim | ......................... F16H 3/728 |
| 10,543,748 | B2 * | 1/2020 | Duhaime | ............... B60K 6/442 |
| 2005/0107207 | A1 * | 5/2005 | Imazu | ................... B60W 20/00 477/35 |
| 2011/0312462 | A1 * | 12/2011 | Park | ........................ F16H 3/728 475/5 |

* cited by examiner

*Primary Examiner* — Edwin A Young
(74) *Attorney, Agent, or Firm* — Jeremy J. Klobucar

(57) ABSTRACT

An electrified powertrain that generates and transfers drive torque to a driveline of a hybrid vehicle includes first and second electric motors, an internal combustion engine (ICE), a first, second and third planetary gear set, and multiple clutches. The first planetary gear set is selectively coupled for rotation with the second electric motor, the first planetary gear set including a first sun gear, a first carrier and a first ring gear, wherein the first carrier is coupled to the driveline. The second planetary gear set is selectively coupled for rotation with the second electric motor output, the second planetary gear set including a second sun gear, a second carrier and a second ring gear. An input split device comprises the third planetary gear set that is selectively coupled for rotation with one of the first electric motor and the ICE.

17 Claims, 3 Drawing Sheets

| Gear | CB1 | CB2 | CB3 | C3 | C4 | CR |
|---|---|---|---|---|---|---|
| R | X | | | | | X |
| 1st | X | | | X | | |
| 2nd | | | X | | X | |
| 3rd | | | | X | X | |
| 4th | | X | | | X | |

Fig. 3

FOUR SPEED ELECTRIC VARIABLE TRANSMISSION FOR REAR WHEEL DRIVE HYBRID VEHICLES

FIELD

The present application generally relates to hybrid electric vehicles and, more particularly, to a four speed hybrid electric variable transmission for a rear wheel drive hybrid vehicle.

BACKGROUND

A hybrid electric vehicle includes an internal combustion engine (ICE), at least one high-voltage battery system and at least one electrified drive module having an electric motor and associated electric drive gearbox assembly. Some electric drive gearbox assemblies include one or more than one fixed gear for shifting. Electronically variable transmissions (EVT's) are another example for delivering drive torque between a prime mover (ICE, electric motor, etc.) and a drivetrain. EVT systems are not fixed gears and can provide infinite ratios providing improved efficiency. EVT's are generally associated with front wheel drive vehicles. It can be challenging to provide increased efficiencies and lower emissions while satisfying performance demands. Accordingly, while such gearbox assemblies do work well for their intended purpose in hybrid electric vehicles, there is a desire for improvement in the relevant art.

SUMMARY

According to one example aspect of the invention, an electrified powertrain that generates and transfers drive torque to a driveline of a hybrid vehicle includes a first electric motor, a second electric motor, an internal combustion engine (ICE), a first, second and third planetary gear set, and multiple clutches including an ICE clutch. The first planetary gear set is selectively coupled for rotation with the second electric motor, the first planetary gear set including a first sun gear, a first carrier and a first ring gear, wherein the first carrier is coupled to the driveline. The second planetary gear set is selectively coupled for rotation with the second electric motor output, the second planetary gear set including a second sun gear, a second carrier and a second ring gear. An input split device comprises the third planetary gear set that is selectively coupled for rotation with one of the first electric motor and the ICE, the third planetary gear set including a third sun gear, a third carrier and a third ring gear. The ICE clutch moves between an engaged position that couples the ICE output for rotation with the third carrier and a disengaged position that decouples the ICE output from rotation with the third carrier.

In some implementations, the electrified powertrain further includes a first electric motor clutch that selectively couples the first electric motor output to the third sun gear. In examples, the first electric motor clutch is normally open.

In some implementations, the electrified powertrain further includes a second electric motor clutch that selectively couples the second electric motor output to the third ring gear. In examples, the second electric motor clutch is normally closed.

In some implementations, the electrified powertrain further includes a first brake clutch that selectively couples the first ring gear and the second carrier.

In additional features, the electrified powertrain further includes a second brake clutch that selectively couples the second sun gear with one of the third planetary gear set and the second electric motor.

In additional features, the electrified powertrain further includes a third brake clutch that selectively couples the first sun gear with one of the third planetary gear set and the second electric motor.

In additional features, the electrified powertrain further includes a first intermediate clutch that selectively couples the second sun gear with one of the third planetary gear set and the second electric motor.

In additional features, the electrified powertrain further includes a second intermediate clutch that selectively couples the first sun gear with one of the third planetary gear set and the second electric motor.

In additional features, the electrified powertrain further includes a third intermediate clutch that selectively couples the second carrier with one of the third planetary gear set and the second electric motor.

In additional features, a reverse gear is selected based on closing of the first brake clutch and the first intermediate clutch.

In additional features, a first gear is selected based on closing of the first brake clutch and the second intermediate clutch.

In additional features, a second gear is selected based on closing of the third brake clutch and the third intermediate clutch.

In additional features, a third gear is selected based on closing of the second and third intermediate clutches.

In additional features, a fourth gear is selected based on closing of the second brake clutch and the third intermediate clutch.

In other features, the hybrid electric vehicle is rear wheel drive.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIG. 3 is chart illustrating clutch applications for various gears of the EVT according to one example of the present disclosure.

DESCRIPTION

As mentioned above, EVT systems are generally associated with front wheel drive vehicles. It can be challenging to provide increased efficiencies and lower emissions while satisfying performance demands. The instant disclosure provides a four speed EVT. The four speed EVT includes an input split device that retains the benefits of an EVT while adding a shift element downstream of the input split device to provide higher fuel economy as well as performance. As described herein, the four speed EVT includes a combination of clutches, brakes and planetary gear sets that provides a combination of four fixed gears as well as an EVT. A planetary gear set is used as the input split device.

Figure 1:
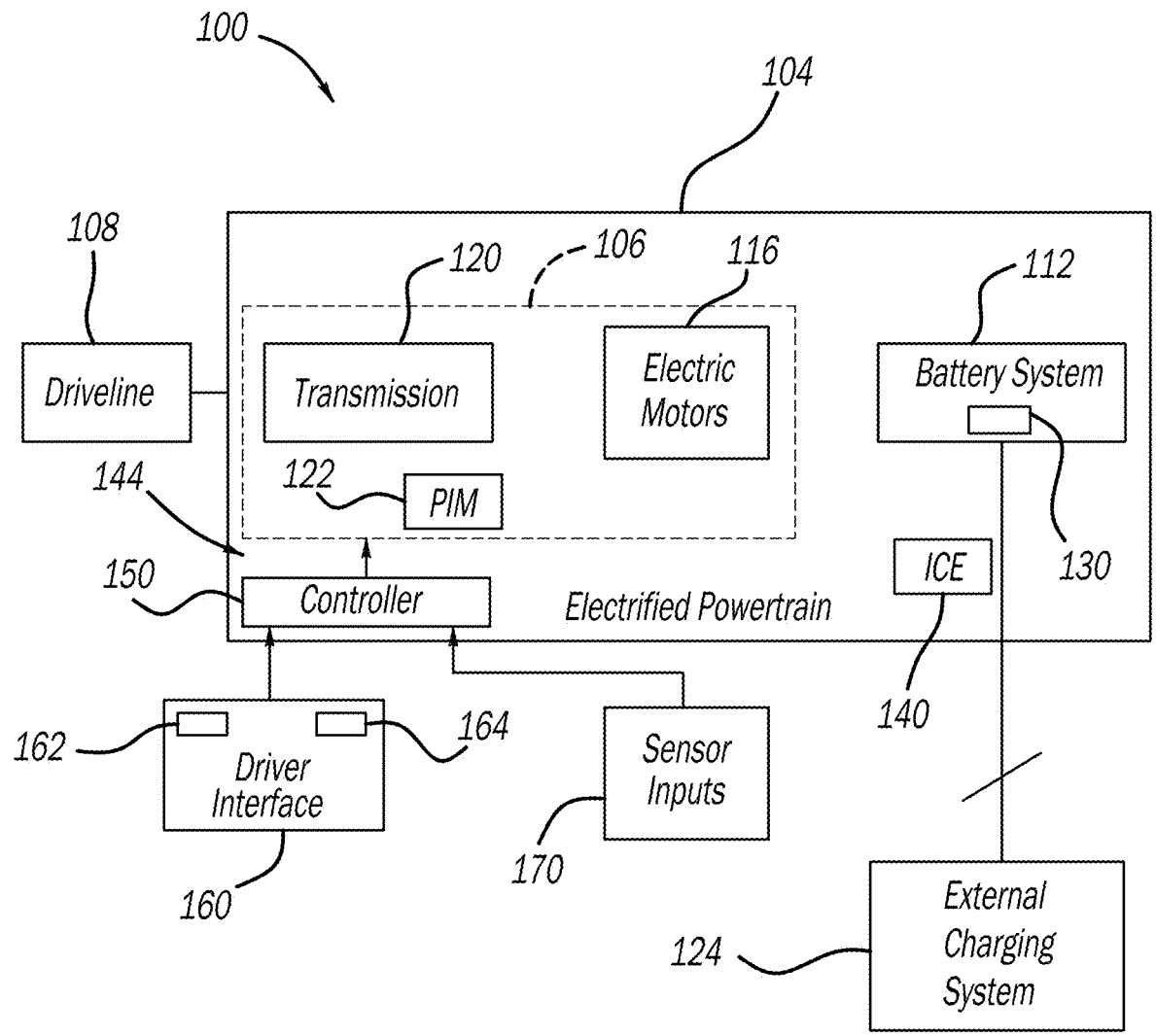
FIG. 1 is a functional block diagram of a hybrid electric vehicle that implements a four speed EVT for a rear wheel drive vehicle according to various principles of the present application.

Referring now to FIG. 1, a functional block diagram of an example hybrid electric vehicle 100 (also referred to herein as "vehicle 100") according to the principles of the present application is illustrated. The vehicle 100 includes an electrified powertrain 104 having an electrified drive module (EDM) 106 configured to generate and transfer drive torque to a driveline 108 for vehicle propulsion. The EDM 106 generally includes one or more electric drive units or motors 116 (e.g., electric traction motors), an electric drive gearbox assembly or transmission 120, and power electronics including a power inverter module (PIM) 122. As will become appreciated herein, the exemplary powertrain 104 includes a first electric motor 116A and a second electric motor 116B. The transmission 120 is configured as a four speed EVT.

The electric motors 116 are connected via the PIM 122 to a high voltage battery system 112 for powering the electric motors 116. The battery system 112 is selectively connectable (e.g., by the driver) to an external charging system 124 (also referred to herein as "charger 124") for charging of the battery system 112. The battery system 112 includes at least one battery pack assembly 130. The electrified powertrain 104 is a hybrid powertrain that additionally includes an internal combustion engine (ICE) 140. As will be described herein, the electric motors 116 and the ICE 140 cooperate to provide drive torque to the driveline 108.

A vehicle control system 144 includes a controller 150 that can provide various inputs to the EDM 106 including torque requests based on signals received from a driver interface 160. In examples, the driver interface 160 can include a drive input device, e.g., an accelerator pedal 162, for providing a driver input, e.g., a torque request, to the controller 150 and ultimately the EDM 106. The driver interface 160 can further include a human machine interface (HMI) 164 for displaying driver information and receiving driver requests. The HMI 164 can include any interface that receives an input from the driver indicative of a desire of the driver to alter any parameter of the powertrain 104 such as a torque output. In some examples, the HMI can be arranged on a steering wheel of the electrified vehicle 100.

While the vehicle control system 144 is shown as a single controller 150, it will be appreciated that more controllers and/or modules, such as a supervisory electrified vehicle control module, a battery control module, a motor control module and a chassis stability module, can be utilized to control various vehicle components of the hybrid electric vehicle 100. In this regard, various controllers and modules are configured to communicate with each other, utilizing different sensor inputs 170 and calculated parameters as disclosed herein for controlling operation of the powertrain 104.

Figure 2:
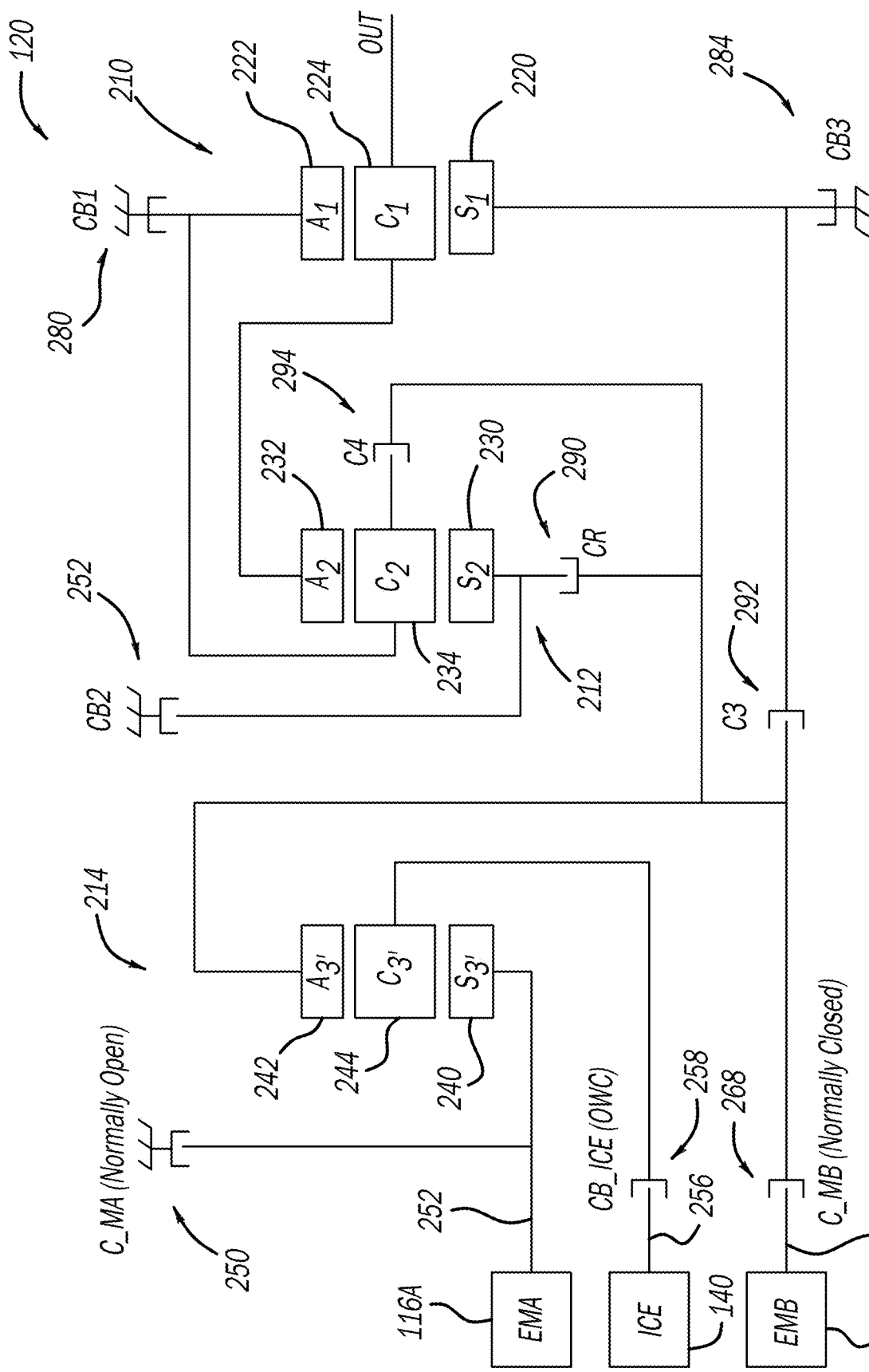
FIG. 2 is a schematic illustration of the four speed EVT of FIG. 1 according to one example of the present disclosure.

With additional reference now to FIG. 2, the four speed EVT 120 will be further described. As shown, the four speed EVT 120 is driven by the electric motors 116A, 116B and the ICE 140. The four speed EVT 120 includes three planetary gear sets 210, 212 and 214. The first planetary gear set 210 includes a first sun gear 220, a first annulus or ring gear 222 and a first carrier 224. The second planetary gear set 212 includes a second sun gear 230, a second annulus or ring gear 232 and a second carrier 234. The third planetary gear set 214 includes a third sun gear 240, a third annulus or ring gear 242 and a third carrier 244.

A first electric motor clutch 250 connects the third sun gear 240 with a first electric motor output 252 of the first electric motor 116A. The first electric motor clutch 250 can be a brake clutch that is normally open. An ICE output 256 of the ICE 140 is selectively coupled to the third carrier 244 through an ICE clutch 258. The ICE clutch 258 can be a one-way clutch. A second electric motor output 262 of the second electric motor 116B is selectively coupled with the third ring gear 242 through a second electric motor clutch 268. The second electric motor clutch 268 can be a brake clutch that is normally closed.

A first brake clutch 280 can selectively couple the first ring gear 222 with the second carrier 234. A second brake clutch 252 can selectively brake the second sun gear 230. A third brake clutch 284 can selectively brake the first sun gear 220. A first intermediate clutch 290 selectively couples the second sun gear 230 of the second planetary gear set 212 with one of the third planetary gear set 214 and the second electric motor output 262. A second intermediate clutch 292 selectively couples the first sun gear 220 of the first planetary gear sets 210 with one of the third planetary gear set 214 and the second electric motor output 262. A third intermediate clutch 294 selectively couples the second carrier 234 of the second planetary gear set 212 with one of the third planetary gear set 214 and the second electric motor output 262.

Figure 3:
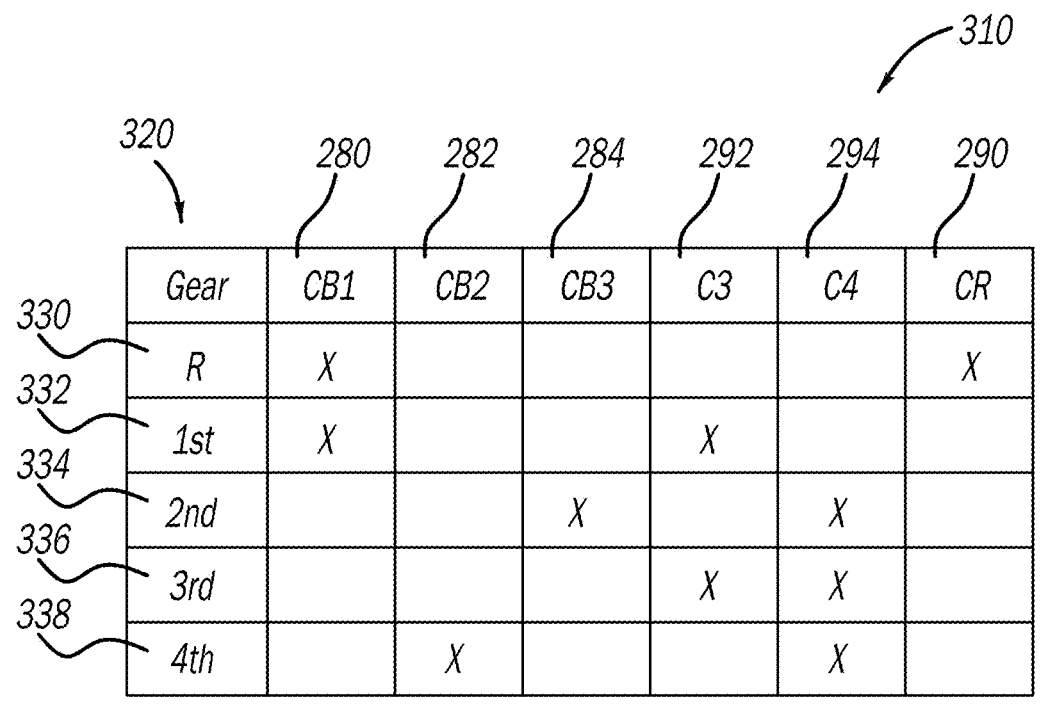

With continued reference to FIG. 2 and additional reference to FIG. 3, operation of the four speed transmission 120 according to principles of the present disclosure will be described. FIG. 3 illustrates a shifting table 310. The shifting table 310 illustrates a series of gears 320 available with the four speed transmission 120. The gears 320 include a reverse gear 330, a first gear 332, a second gear 334, a third gear 336 and a fourth gear 338. The first planetary gear set 210 and the second planetary gear set 212 act as shifting devices.

The reverse gear 330 is selected by closing the clutches 280 and 290 while opening the clutches 282, 284, 292 and 294. The first gear 332 is selected by closing the clutches 280 and 292 while opening the clutches 282, 284, 294 and 290. The second gear 334 is selected by closing the clutches 284 and 294 while opening the clutches 280, 282, 292 and 290. The third gear 336 is selected by closing the clutches 292 and 294 while opening the clutches 280, 282, 284 and 290. The fourth gear 338 is selected by closing the clutches 282 and 294 while opening the clutches 280, 284, 292 and 290.

The four speed EVT 120 provides many advantages over prior art configurations. For example, the four speed EVT 120 provides higher fuel economy during city driving conditions using the third planetary gear set 214 as an input split. The four speed EVT 120 provides improved fuel economy on highway driving conditions as a mechanical point is always available with the clutch 250 locked and the clutch 268 open. Acceleration from 0-60 miles per hour and forward gradeability performance is improved due to added ratios from the shifting devices. In other words, pure EVT configurations do not provide the available acceleration that the four speed EVT 120 provides. Gradeability performance in reverse gear 330 is improved using the clutches 280 and 290. Motor sizing reduction of one or both of the first and second electric motors 116A and 116B can be utilized due to the ICE clutch 258 which allows for two electric motor inputs in forward drive.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electrified powertrain that generates and transfers drive torque to a driveline of a hybrid electric vehicle, the electrified powertrain comprising:
    a first electric motor having a first electric motor output;
    a second electric motor having a second electric motor output;
    an internal combustion engine (ICE) having an ICE output;
    a first planetary gear set selectively coupled for rotation with the second electric motor output, the first planetary gear set including a first sun gear, a first carrier and a first ring gear, wherein the first carrier is coupled to the driveline;
    a second planetary gear set selectively coupled for rotation with the second electric motor output, the second planetary gear set including a second sun gear, a second carrier and a second ring gear;
    an input split device comprising a third planetary gear set selectively coupled for rotation with one of the first electric motor output and the ICE output, the third planetary gear set including a third sun gear, a third carrier and a third ring gear; and
    an ICE clutch that moves between an engaged position that couples the ICE output for rotation with the third carrier and a disengaged position that decouples the ICE output from rotation with the third carrier.

2. The electrified powertrain of claim 1, further comprising:
    a first electric motor clutch that selectively couples the first electric motor output to the third sun gear.

3. The electrified powertrain of claim 2, wherein the first electric motor clutch is normally open.

4. The electrified powertrain of claim 2, further comprising:
    a second electric motor clutch that selectively couples the second electric motor output to the third ring gear.

5. The electrified powertrain of claim 4, wherein the second electric motor clutch is normally closed.

6. The electrified powertrain of claim 4, further comprising:
    a first brake clutch that selectively couples the first ring gear and the second carrier.

7. The electrified powertrain of claim 6, further comprising:
    a second brake clutch that selectively couples the second sun gear with one of the third planetary gear set and the second electric motor.

8. The electrified powertrain of claim 7, further comprising:
    a third brake clutch that selectively couples the first sun gear with one of the third planetary gear set and the second electric motor.

9. The electrified powertrain of claim 8, further comprising:
    a first intermediate clutch that selectively couples the second sun gear with one of the third planetary gear set and the second electric motor.

10. The electrified powertrain of claim 9, further comprising:
    a second intermediate clutch that selectively couples the first sun gear with one of the third planetary gear set and the second electric motor.

11. The electrified powertrain of claim 10, further comprising:
    a third intermediate clutch that selectively couples the second carrier with one of the third planetary gear set and the second electric motor.

12. The electrified powertrain of claim 11, wherein a reverse gear is selected based on closing of the first brake clutch and the first intermediate clutch.

13. The electrified powertrain of claim 11, wherein a first gear is selected based on closing of the first brake clutch and the second intermediate clutch.

14. The electrified powertrain of claim 11, wherein a second gear is selected based on closing of the third brake clutch and the third intermediate clutch.

15. The electrified powertrain of claim 11, wherein a third gear is selected based on closing of the second and third intermediate clutches.

16. The electrified powertrain of claim 11, wherein a fourth gear is selected based on closing of the second brake clutch and the third intermediate clutch.

17. The electrified powertrain of claim 1, wherein the hybrid electric vehicle is rear wheel drive.

* * * * *